(12) United States Patent
Chang et al.

(10) Patent No.: US 8,675,320 B2
(45) Date of Patent: Mar. 18, 2014

(54) OVERCURRENT DETECTION CIRCUIT AND OVERCURRENT DETECTION METHOD

(75) Inventors: Hsiang-Chung Chang, Hsinchu (TW); Hung-Ta Hsu, New Taipei (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 3 days.

(21) Appl. No.: 13/481,876

(22) Filed: May 28, 2012

(65) Prior Publication Data

US 2013/0163136 A1 Jun. 27, 2013

(30) Foreign Application Priority Data

Dec. 23, 2011 (TW) .............................. 100148331 A (51) Int. Cl.
*H02H 9/08* (2006.01)
(52) U.S. Cl.
USPC ........................................... 361/18; 361/93.9

(58) Field of Classification Search
USPC .......................................... 361/18, 93.7–93.9
See application file for complete search history.

(56) References Cited

U.S. PATENT DOCUMENTS

2002/0105767 A1* 8/2002 Schuellein et al. .......... 361/93.1
2009/0147420 A1* 6/2009 Graf et al. ...................... 361/56

* cited by examiner

*Primary Examiner* — Danny Nguyen
(74) *Attorney, Agent, or Firm* — Winston Hsu; Scott Margo (57) ABSTRACT

An overcurrent detection circuit for a DC-to-DC power converter is disclosed. The overcurrent detection circuit includes a dynamic reference unit for outputting a dynamic reference signal, a load current measurement unit for measuring a load current of the DC-to-DC power converter to output a measurement signal, and a first comparator including a positive input terminal coupled to the load current measurement unit, a negative input terminal coupled to the dynamic reference unit and an output terminal coupled to an overcurrent protection device for outputting an overcurrent protection signal to activate the overcurrent protection device when the measurement signal is greater than the dynamic reference signal.

17 Claims, 6 Drawing Sheets

OVERCURRENT DETECTION CIRCUIT AND OVERCURRENT DETECTION METHOD

BACKGROUND OF THE INVENTION

1. Field of the Invention

The present invention relates to an overcurrent detection circuit and overcurrent detection method, and more particularly, to an overcurrent detection circuit and overcurrent detection method adjusting current limit level when the temperature and a system voltage vary.

2. Description of the Prior Art

A traditional overcurrent detection circuit measures a load current outputted by a power converter, and transfers the load current to an overcurrent signal to determine whether the load current is greater than a reference signal to activate an overcurrent protection circuit, so as to protect a power system from excess current damaging the power converter or the load. In general, the reference signal is commonly to be a stable reference signal, which has a zero temperature coefficient or has an isolated power source, in other words, the reference signal has a constant value no matter the temperature or a system voltage in the power system varies.

Figure 1A:
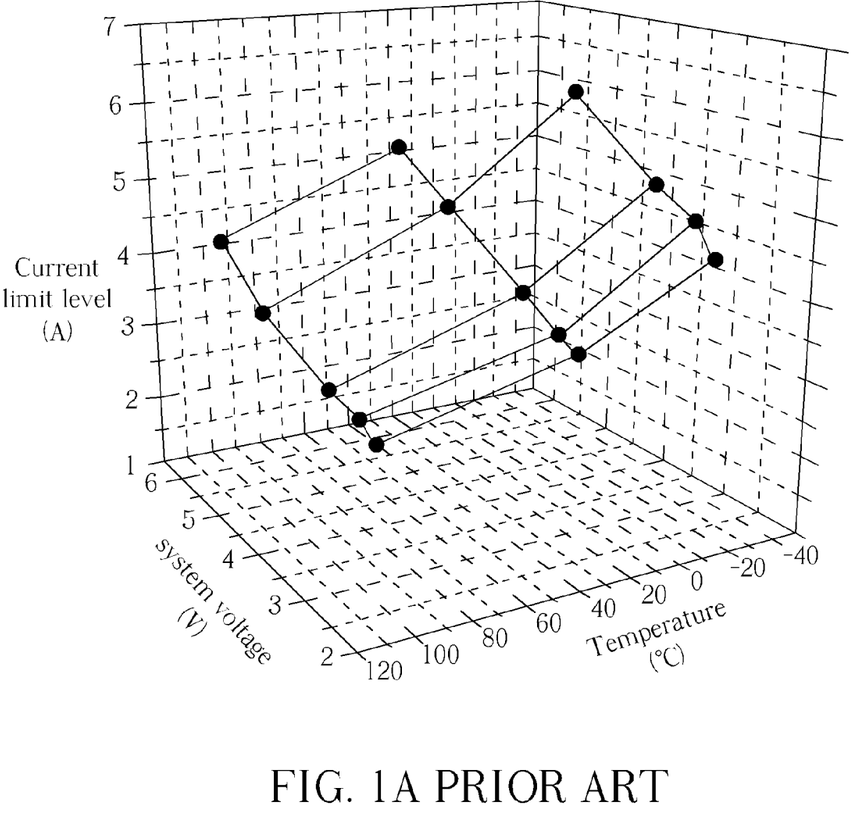
FIG. 1A is a schematic diagram illustrating current limit levels of a traditional power IC when the temperature and a system voltage vary.
Figure 1B:
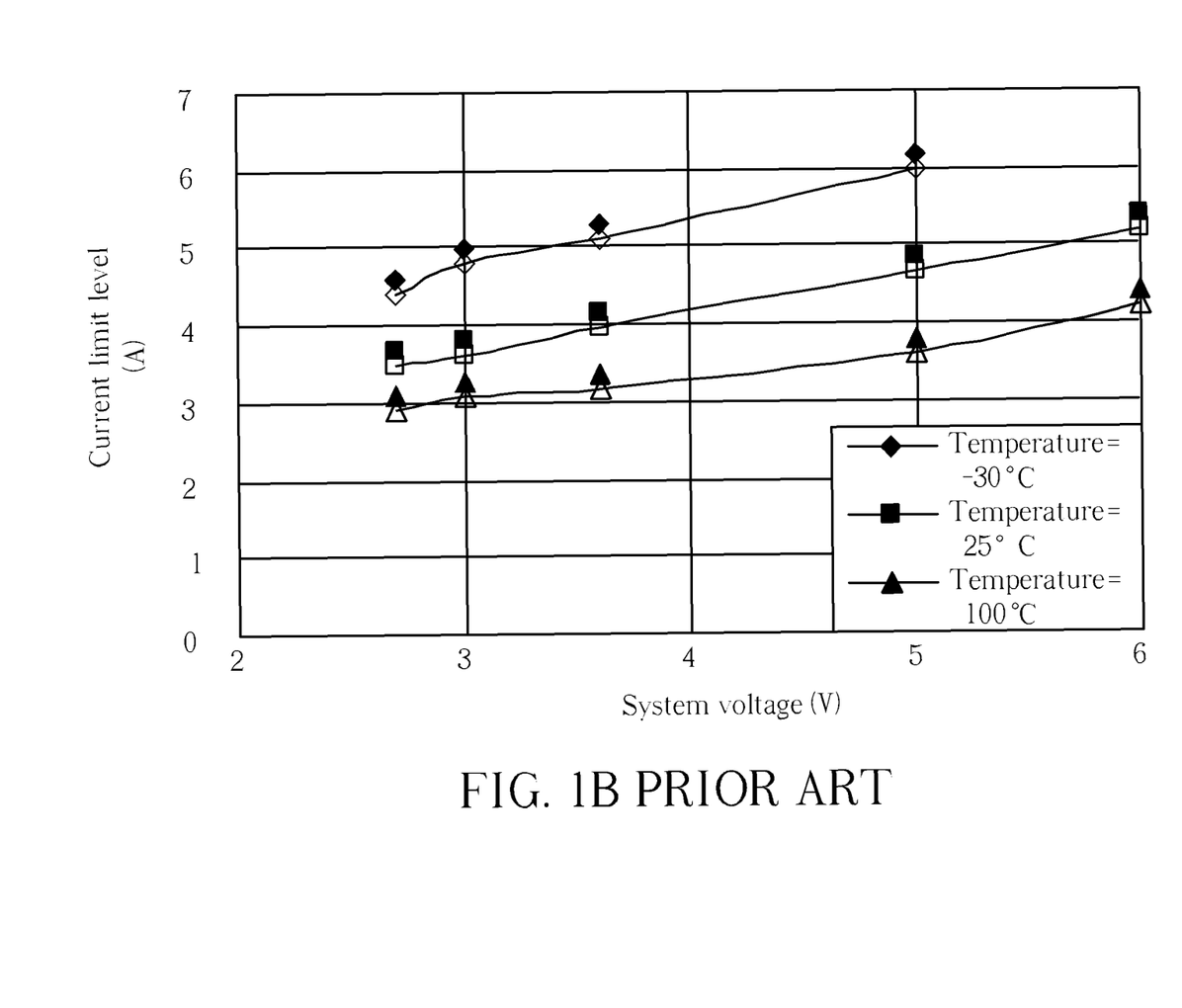
FIG. 1B is schematic diagrams illustrating current limit levels of a traditional power IC when the temperature and a system voltage vary.

However, the stable reference signal may not accurately respond to an occurrence of overcurrent in the power system. For example, please refer to FIG. 1A and FIG. 1B that are schematic diagrams of current limit levels (herein after CLL) of a traditional power integrated circuit (IC) when the temperature and a system voltage PVDD vary, respectively. As shown in FIG. 1A, when the temperature varies from a high temperature to a low temperature, the CLL increases from a low current to a high current. The CLL increases when the system voltage PVDD varies from a low voltage to a high voltage. Similarly, as shown in FIG. 1B, the lower the temperature and the higher the system voltage is, the higher the CLL becomes. In contrast, the higher the temperature and the lower the system voltage is, the lower the CLL becomes. If during a period of low temperature and high voltage, the overcurrent detection circuit may activate the overcurrent protection circuit to drain the overcurrent earlier than the load current reaching the CLL, which may lower a power efficiency of the power IC. If in the high temperature and the low voltage situation, the overcurrent detection circuit may activate the overcurrent protection circuit after the load current has reached the CLL, which may lead to the overcurrent protection circuit not draining the overcurrent in time, and risking damage to the power system or the load.

As can be seen, the CLL is deeply influenced by the temperature and the system voltage, which may lead to the stable reference signal not accurately responding to an occurrence of overcurrent in the power system. Thus, there is a need to improve the prior art to avoid a judgment failure of the overcurrent.

SUMMARY OF THE INVENTION

It is therefore an object of the present invention to provide an overcurrent detection circuit and overcurrent detection method.

The present invention discloses an overcurrent detection circuit for a DC-to-DC power converter. The overcurrent detection circuit includes a dynamic reference unit for outputting a dynamic reference signal, a load current measurement unit for measuring a load current of the DC-to-DC power converter to output a measurement signal, and a first comparator including a positive input terminal coupled to the load current measurement unit, a negative input terminal coupled to the dynamic reference unit and an output terminal coupled to an overcurrent protection device for outputting an overcurrent protection signal to activate the overcurrent protection device when the measurement signal is greater than the dynamic reference signal.

The present invention further discloses an overcurrent detection method for a DC-to-DC power converter. The overcurrent detection method includes generating a measurement signal and a dynamic reference signal, and outputting an overcurrent protection signal to activate an overcurrent protection device according to the measurement signal and the dynamic reference signal.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
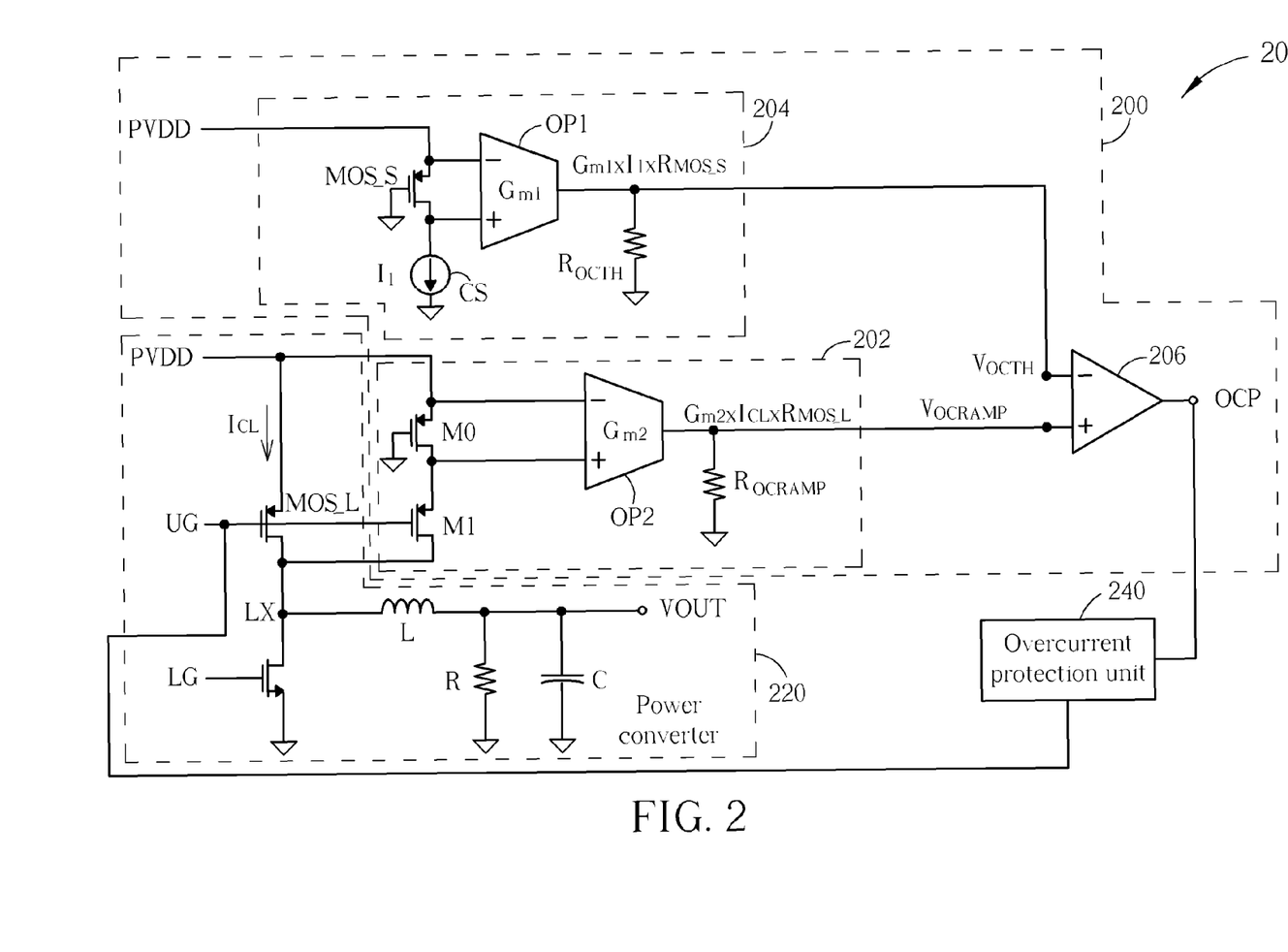
FIG. 2 is a schematic diagram of a power system according to an embodiment of the present invention.

Please refer to FIG. 2, which is a schematic diagram of a power system 20 according to an embodiment of the present invention. The power system 20 includes an overcurrent detection circuit 200, a power converter 220 and an overcurrent protection unit 240. The overcurrent detection circuit 200 includes a measurement unit 202, a reference unit 204 and a comparator 206. The measurement unit 202 is used for detecting a load current $I_{CL}$ of the power converter 220 to generate a measurement signal $V_{OCRAMP}$. The reference unit 204 is used for generating a reference signal $V_{OCTH}$. A positive input terminal and a negative input terminal of the comparator 206 are respectively coupled to the measurement unit 202 and the reference unit 204 to output an overcurrent protection signal OCP to the overcurrent protection unit 240 when the measurement signal $V_{OCRAMP}$ is greater than the reference signal $V_{OCTH}$, so as to drain the load current $I_{CL}$ of the power converter 220, which prevents the overcurrent from damaging the power converter 220 or an output load of the power converter 220.

In operation, the measurement unit 202 comprises transistors M1 and M0, an operational amplifier OP2 and a resistor $R_{OCRAMP}$. The measurement unit 202 may utilize the transistor M1 to copy the load current $I_{CL}$ of the power converter 220, i.e. the current flowing on a high-side switch MOS_L, such that a current flowing on the transistor M0 cascaded to the transistor M1 may be the same as the load current $I_{CL}$. Since the transistor M0 is a P-type transistor whose source and gate are respectively coupled to a system voltage PVDD and a ground, a source-gate voltage difference of the transistor M0 is always greater than its turn-on voltage, and thus the transistor M0 is always turned on. In such a situation, the current flowing on the transistor M0 is determined by the transistor M1.

The operational amplifier OP2 has a conductance $G_{M2}$, and its positive and negative input terminals are respectively coupled to a drain and a source of the transistor M0, an output terminal of the operational amplifier OP2 is coupled to a resistor $R_{OCRAMP}$. A source of the high-side switch MOS_L and a source of the transistor M0 are both coupled to the system voltage PVDD, the transistor M1 pulls a voltage at the drain of the transistor M0 to be a voltage at a drain of the high-side switch MOS_L, such that the source-drain voltage difference of the transistor M0 equals to a source-drain voltage difference of the high-side switch MOS_L. Besides, by properly selecting the transistor M0, the transistor M0 and the high-side switch MOS_L may have similar operating characteristics. As a result, the operational amplifier OP2 may output the measurement signal $V_{OCRAMP}$ according to the source-drain voltage difference of the high-side switch MOS_L, a resistance of the resistor $R_{OCRAMP}$ and the conductance $G_{M2}$, wherein the source-drain voltage difference $V_{DS}$ of the high-side switch MOS_L (or the transistor M0) is $V_{SD}=I_{CL} \times R_{MOS\_L}$ and the $R_{MOS\_L}$ is an inner resistance of the transistor MOS_L. Therefore, the measurement signal $V_{OCRAMP}$ may be written as the following formula:

$$V_{OCRAMP}=(I_{CL} \times R_{MOS\_L}) \times G_{m2} \times R_{OCRAMP} \quad (1)$$

Noticeably, the operating characteristics of transistors such as the high-side switch MOS_L or the transistors M0 and M1 cause inner resistances or output characteristics of the transistors to be associated with the temperature and an applied voltage, i.e. the system voltage PVDD, such that the measurement signal $V_{OCRAMP}$ varies with the temperature and the applied voltage. For example, when the temperature increases, the inner resistances of the transistors M0 and M1 increase, and the source-drain voltage difference ($V_{SD}=I_{CL} \times R_{MOS\_L}$) of the high-side switch MOS_L increases as well. The source-drain voltage difference $V_{SD}$ is amplified by the operational amplifier OP2 to obtain the increased measurement signal $V_{OCRAMP}$ due to the increased inner resistance $R_{MOS\_L}$. In such a situation, if the reference signal $V_{OCTH}$ is a stable voltage and the measurement signal $V_{OCRAMP}$ increases as the temperature increases, the comparator 206 may determine an overcurrent has occurred and activate the overcurrent protection unit 240 in advance. Or, if the inner resistance $R_{MOS\_L}$ of the high-side switch MOS_L decreases as the system voltage PVDD increases, the source-drain voltage difference $V_{SD}$ decreasing accordingly such that the measurement signal $V_{OCRAMP}$ decreases. Likewise, if the reference signal $V_{OCTH}$ is a stable voltage and the measurement signal $V_{OCRAMP}$ decreases as the system voltage PVDD increases, the comparator 206 may determine an overcurrent has not occurred and the comparator 206 does not activate the overcurrent protection unit 240 in time. As a result, the overcurrent detection circuit 200 may fail to accurately determine whether an overcurrent has occurred.

Moreover, electric elements such as the resistor $R_{OCRAMP}$ and the operational amplifier OP2 may be influenced by the temperature to change its resistance or output characteristics. Thus, the measurement signal $V_{OCRAMP}$ in formula (1) may be rewritten to include parameters of the temperature and the system voltage PVDD:

$$V_{OCRAMP}(T,PVDD)=I_{CL}(T,PVDD) \times R_{MOS\_L}(T,PVDD) \times G_{m2}(T) \times R_{OCRAMP}(T) \quad (2)$$

Therefore, if the reference unit 204 is capable of providing the reference signal $V_{OCTH}$ associated with the temperature and the system voltage PVDD, an accuracy of activating the overcurrent protection unit 240 may be improved. The reference unit 204 includes a current source CS, a transistor MOS_S, an operational amplifier OP1 and a resistor $R_{OCTH}$. A difference between the reference unit 204 and the measurement unit 202 is that the current source CS is cascaded to the transistor MOS_S to provide a reference current $I_1$ to the transistor MOS_S. A positive input terminal and a negative input terminal of the operational amplifier OP1 are respectively coupled to a drain and a source of the transistor MOS_S, an output terminal of the operational amplifier OP1 is coupled to the resistor $R_{OCTH}$. In such a structure, the operational amplifier OP1 may output the reference signal $V_{OCTH}$ according to a source-drain voltage difference of the transistor MOS_S, i.e. $V_{DS}=I_1 \times R_{MOS\_S}$, wherein $R_{MOS\_S}$ is an inner resistance of the transistor MOS_S, a resistance of the resistor $R_{OCTH}$ and a conductance $G_{m1}$ of the operational amplifier OP1. Then the reference signal $V_{OCTH}$ may be written as the following formula:

$$V_{OCTH}=(I_1 \times R_{MOS\_S}) \times G_{m1} \times R_{OCTH} \quad (3)$$

Similarly, the inner resistance $R_{MOS\_S}$ or an output characteristic of the transistor MOS_S are associated with the temperature and the system voltage PVDD, such that the inner resistance $R_{MOS\_S}$ of the transistor MOS_S varies as the temperature and system voltage PVDD vary. Besides, electronic elements such as the resistor $R_{OCTH}$, the operational amplifier OP1 and the current source CS are influenced by the temperature to change its resistances or output characteristics. Thus, the reference signal $V_{OCTH}$ may be written to include the parameters of the temperature and the system voltage PVDD, as shown in the formula:

$$V_{OCTH}(T,PVDD)=I_1(T) \times R_{MOS\_S}(T,PVDD) \times G_{m1}(T) \times R_{OCTH}(T) \quad (4)$$

Divide formula (4) by formula (2):

$$\frac{V_{OCTH}(T,PVDD)}{V_{OCRAMP}(T,PVDD)} = \frac{R_{MOS\_S}(T,PVDD)}{R_{MOS\_L}(T,PVDD)} \times \frac{G_{m1}(T)}{G_{m2}(T)} \times \frac{R_{OCTH}(T)}{R_{OCRAMP}(T)} \times \frac{I_1(T)}{I_{CL}(T,PVDD)} \quad (5)$$

As can be seen from formula (5), the measurement signal $V_{OCRAMP}$ and the reference signal $V_{OCTH}$ may be written as functions of the temperature and the system voltage PVDD. In order to accurately determine whether an overcurrent has occurred or not, the reference signal $V_{OCTH}$ may be proportional to the measurement signal $V_{OCRAMP}$ by properly selecting the transistors MOS_L and MOS_S having a same type and a same size (channel ratio W/L), conductance $G_{M1}$ and $G_{M2}$ of the operational amplifiers OP1 and OP2 and resistances of the resistors $R_{OCTH}$ and $R_{OCRAMP}$. The comparator 206 compares the measurement signal $V_{OCRAMP}$ with the reference signal $V_{OCTH}$ to cancel the parameters of the temperature and the system voltage PVDD of the measurement signal $V_{OCRAMP}$ and the reference signal $V_{OCTH}$ to obtain the overcurrent protection signal OCP independent of the temperature and the system voltage PVDD.

As a result, since the reference signal $V_{OCTH}$ is proportional to the measurement signal $V_{OCRAMP}$, the overcurrent detection circuit 200 may accurately detect whether an overcurrent of the power system 20 has occurred, which prevents the comparator 206 from activating the overcurrent protection unit 240 in advance in the high temperature and also prevents the comparator 206 from activating the overcurrent protection unit 240 late when the system voltage PVDD becomes high.

Furthermore, when the overcurrent has occurred, it may be assumed that the measurement signal $V_{OCRAMP}$ is equal to the reference signal $V_{OCTH}$, and rearrange formula (5) to obtain formula (6):

$$I_{CL}(T, PVDD) = \frac{R_{MOS\_S}(T, PVDD)}{R_{MOS\_L}(T, PVDD)} \times \frac{G_{M1}(T)}{G_{M2}(T)} \times \frac{R_{OCTH}(T)}{R_{OCRAMP}(T)} \times I_1(T) \quad (6)$$

As can be seen from formula (6), the load current $I_{CL}$ may be regarded as a multiple of the reference current $I_1$ once the transistors MOS_L and MOS_S, the conductance $G_{M1}$ of the operational amplifier OP1, the conductance $G_{M2}$ of the operational amplifier OP2, and resistances of the resistors $R_{OCTH}$ and $R_{OCRAMP}$ are chosen. For ensuring the reference signal $V_{OCTH}$ is substantially equal to the measurement signal $V_{OCRAMP}$, the overcurrent detection circuit 200 may further include a signal adjustment unit for adjusting the reference current $I_1$ to adjust the reference signal $V_{OCTH}$.

Figure 3:
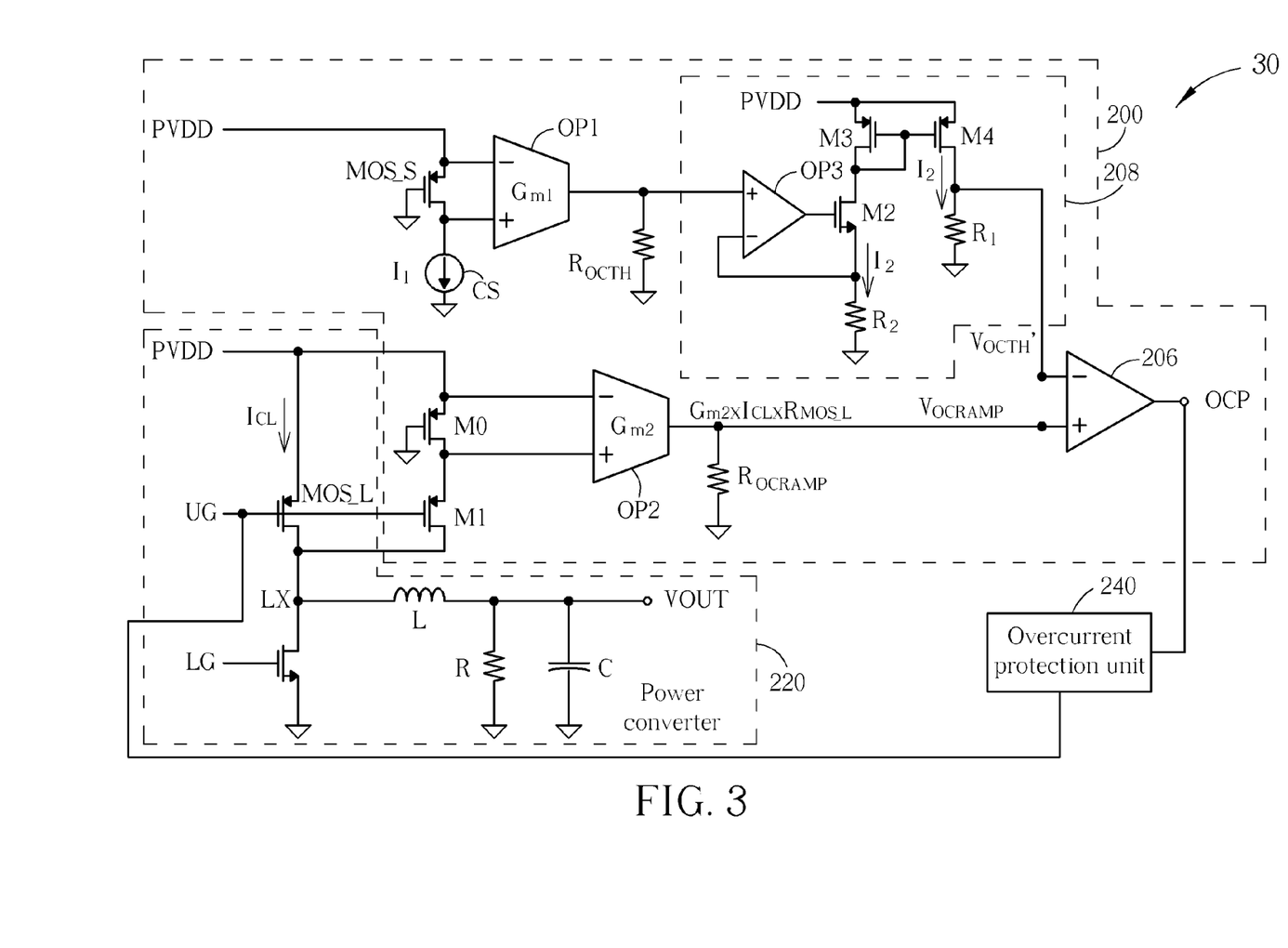
FIG. 3 is a schematic diagram of a power system according to another embodiment of the present invention.

Please refer to FIG. 3, which is a schematic diagram of a power system 30 according to an embodiment of the present invention. The power system 30 further includes a signal adjustment unit 208 between the comparator 206 and the reference unit 204. The signal adjustment unit 208 includes a comparator OP3, a transistor M2, resistors $R_1$ and $R_2$, and a current mirror comprising transistors M3 and M4. As shown in FIG. 3, a positive input terminal of the comparator OP3 is coupled to the output terminal of the reference unit 204 for receiving the reference signal $V_{OCTH}$, an output terminal and a negative input terminal of the comparator OP3 are respectively coupled to a gate and a source of the transistor M2. In such an arrangement, the signal adjustment unit 208 may utilize a negative feed back path formed between the comparator OP3 and the transistor M2 to pull a voltage at the negative input terminal of the comparator OP3 to be equal to a voltage at the positive input terminal of the comparator OP3, so as to turn on the transistor M2 to generate a current $I_2$ flowing on the transistors M2 and M3. The transistor M4 accordingly copies the current $I_2$, and the current $I_2$ flows through the resistor $R_1$ to the ground, wherein the current $I_2$ may be written as $$\frac{V_{OCTH}}{R_2}.$$

As a result, a reference signal $V_{OCTH'}$ adjusted by the signal adjustment unit 208 may be written as:

$$V'_{OCTH} = I_2 \times R_1 = \frac{V_{OCTH}}{R_2} \times R_1 = (I_1 \times R_{MOS\_S}) \times G_{M1} \times R_{OCTH} \times \frac{R_1}{R_2} \quad (7)$$

As can be seen from formula (7), the reference signal $V_{OCTH'}$ may be adjusted by changing a ratio of the resistors $R_1$ and $R_2$.

Figure 4:
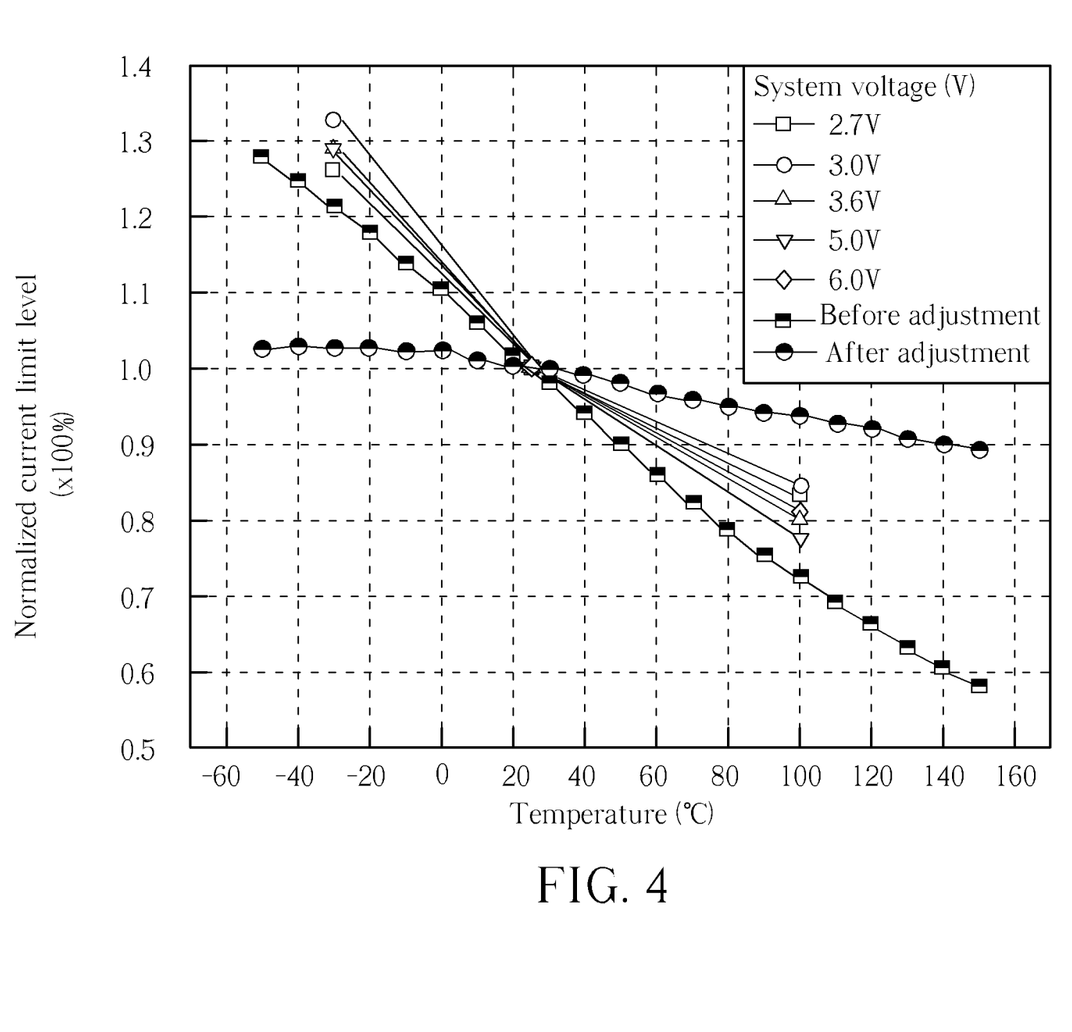
FIG. 4 is a schematic diagram illustrating normalized current limit levels of a power IC varying with the temperature and the system voltage.

Please refer to FIG. 4, which is a schematic diagram illustrating normalized CLLs of a power IC varying with the temperature and the system voltage PVDD, wherein the normalized CLL is derived from dividing the load current $I_{CL}$ by the CLL. As shown in FIG. 4, before the reference signal $V_{OCTH}$ is adjusted, the normalized CLL of the power IC has a negative temperature coefficient, that is, the normalized CLL of the power IC decreases as the temperature increases. As the temperature increases from −50 Celsius degrees to 150 Celsius degrees, the normalized CLL decreases from 1.3 to 0.6. In comparison, after the reference signal $V_{OCTH}$ is adjusted, the normalized CLL of the power IC keeps substantially at 1, which means the load current $I_{CL}$ is substantially equal to the CLL. As the temperature increases from −50 Celsius degrees to 150 Celsius degrees, the normalized CLL slightly decreases to 0.9. Thus, influences of the temperature and the system voltage PVDD to the CLL are both improved.

Figure 5:
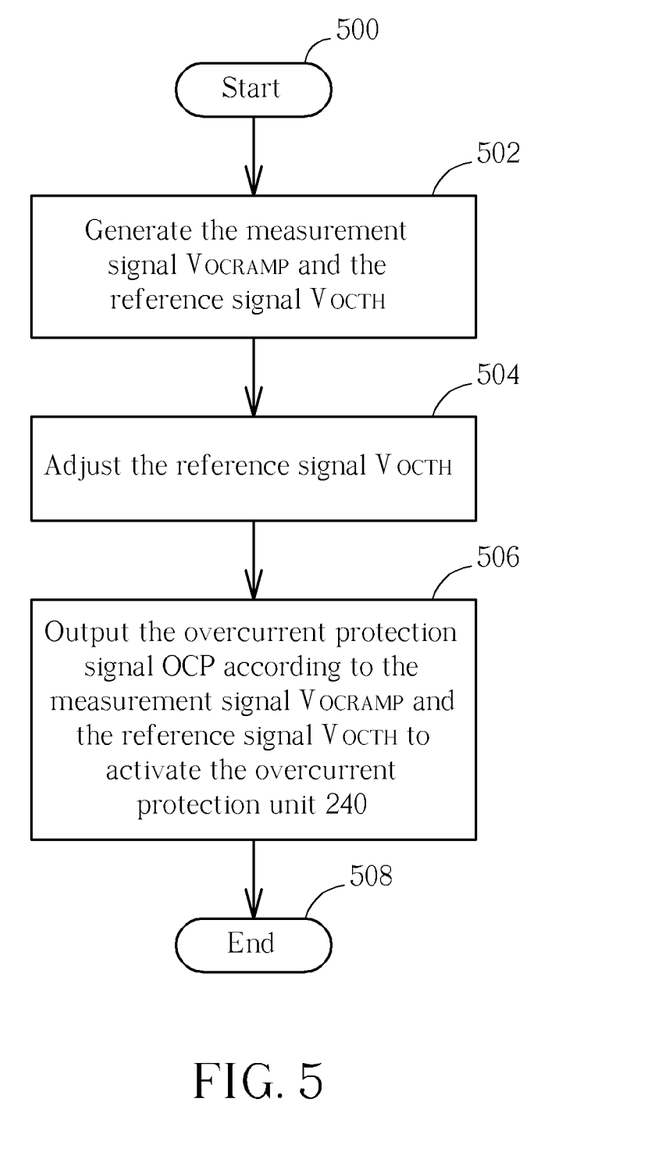
FIG. 5 is a schematic diagram of an overcurrent detection process according to an embodiment of the present invention.

Operations of the power systems 20 and 30 may be summarized into an overcurrent detection process 50, as shown in FIG. 5, the overcurrent detection process 50 includes the following steps:

Step 500: Start.

Step 502: Generate the measurement signal $V_{OCRAMP}$ and the reference signal $V_{OCTH}$.

Step 504: Adjust the reference signal $V_{OCTH}$.

Step 506: Output the overcurrent protection signal OCP according to the measurement signal $V_{OCRAMP}$ and the reference signal $V_{OCTH}$ to activate the overcurrent protection unit 240.

Step 508: End.

Detailed operations of the current detection process 50 may be obtained by referring to above description, which is omitted for simplicity.

To sum up, the traditional overcurrent detection circuit only provides a stable or constant reference signal independent of the temperature and the system voltage. However, in practice, the overcurrent detection circuit of the power system or the power converter is deeply influenced by the temperature and the system voltage, which leads to the overcurrent detection circuit may not be able to accurately determine whether the overcurrent has occurred or not. In comparison, the present invention provides the overcurrent detection circuit capable of generating the reference signal proportional to the measurement signal, and utilizes the comparator comparing the measurement signal with the reference signal to cancel the parameters of the temperature and the system voltage to improve the CLL, such that the overcurrent detection circuit determines the overcurrent accurately.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An overcurrent detection circuit for a DC-to-DC power converter, comprising:
   a dynamic reference unit for outputting a dynamic reference signal, and including:
   a first resistor having a resistance;
   a reference current source for generating a reference current;
   a first transistor including a gate coupled to a ground, a source coupled to a system voltage, and a drain coupled to the reference current source, the reference current flows through the first transistor to generate a cross voltage of the first transistor; and
   a first operational amplifier including:
   a negative input terminal coupled to the source of the first transistor;
   a positive input terminal coupled to the drain of the first transistor; and
   an output terminal coupled to the first resistor and the negative input terminal of the first comparator for outputting the dynamic reference signal to the negative input terminal of the first comparator according to the cross voltage of the first transistor, a conductance of the first operational amplifier and the resistance of the first resistor;

a load current measurement unit for measuring a load current of the DC-to-DC power converter to output a measurement signal; and a first comparator including a positive input terminal coupled to the load current measurement unit, a negative input terminal coupled to the dynamic reference unit and an output terminal coupled to an overcurrent protection device for outputting an overcurrent protection signal to activate the overcurrent protection device when the measurement signal is greater than the dynamic reference signal.

2. The circuit of claim 1, wherein the cross voltage of the first transistor is associated with the system voltage, such that the dynamic reference unit outputs the dynamic reference signal associated with the system voltage when the system voltage varies.

3. The circuit of claim 1, wherein the cross voltage of the first transistor is associated with the temperature, such that the dynamic reference unit outputs the dynamic reference signal associated with the temperature when the temperature varies.

4. The circuit of claim 1, wherein the load current measurement unit comprises:
a second resistor having a resistance;
a first current mirror for copying the load current of the DC-to-DC power converter;
a second transistor cascaded to the first current mirror, the load current copied by the first current mirror flows to the second transistor to generate a cross voltage of the second transistor; and
a second operational amplifier including:
a positive input terminal coupled to a drain of the second transistor; and
a negative input terminal coupled to a source of the second transistor and the system voltage; and
an output terminal coupled to the second resistor and the positive input terminal of the first comparator for outputting the measurement signal to the positive input terminal of the first comparator according to the cross voltage of the second transistor, a conductance of the second operational amplifier and the resistance of the second resistor.

5. The circuit of claim 4, wherein the cross voltage of the second transistor is associated with the system voltage, such that the load current measurement unit outputs the measurement signal associated with the system voltage when the system voltage varies.

6. The circuit of claim 4, wherein the cross voltage of the second transistor is associated with the temperature, such that the load current measurement unit outputs the measurement signal associated with the temperature when the temperature varies.

7. The circuit of claim 1, wherein the dynamic reference signal is associated with the measurement signal.

8. The circuit of claim 1, wherein the overcurrent detection circuit further comprises a dynamic reference signal adjustment unit coupled between the dynamic reference unit and the output terminal of the first comparator for adjusting the dynamic reference signal.

9. The circuit of claim 8, wherein the dynamic reference signal adjustment unit comprises:
a third transistor;

a third resistor coupled between a source of a third transistor and the ground;
a second comparator including:
a positive input terminal coupled to an output terminal of the dynamic reference unit;
a negative input terminal coupled between the third resistor and the source of the third transistor; and
an output terminal coupled to a gate of the third transistor for turning on the third transistor to generate a current flowing on the third transistor when the dynamic reference signal is greater than a cross voltage of the third resistor;
a second current mirror for copying the current flowing on the third transistor; and
a fourth resistor having an end coupled to the second current mirror and the negative input terminal of the first comparator, another end coupled to the ground for outputting the dynamic reference signal according to a cross voltage of the fourth resistor.

10. The circuit of claim 9, wherein the dynamic reference signal adjustment unit adjusts the dynamic reference signal according to a ratio of the resistance of the fourth resistor and the resistance of the third resistor.

11. An overcurrent detection circuit for a DC-to-DC power converter, comprising:
a dynamic reference unit for outputting a dynamic reference signal;
a load current measurement unit for measuring a load current of the DC-to-DC power converter to output a measurement signal, and including:
a second resistor having a resistance;
a first current mirror for copying the load current of the DC-to-DC power converter;
a second transistor cascaded to the first current mirror, the load current copied by the first current mirror flows to the second transistor to generate a cross voltage of the second transistor; and
a second operational amplifier including:
a positive input terminal coupled to a drain of the second transistor; a negative input terminal coupled to a source of the second transistor and the system voltage; and
an output terminal coupled to the second resistor and the positive input terminal of the first comparator for outputting the measurement signal to the positive input terminal of the first comparator according to the cross voltage of the second transistor, a conductance of the second operational amplifier and the resistance of the second resistor; and
a first comparator including a positive input terminal coupled to the load current measurement unit, a negative input terminal coupled to the dynamic reference unit and an output terminal coupled to an overcurrent protection device for outputting an overcurrent protection signal to activate the overcurrent protection device when the measurement signal is greater than the dynamic reference signal.

12. The circuit of claim 11, wherein the cross voltage of the second transistor is associated with the system voltage, such that the load current measurement unit outputs the measurement signal associated with the system voltage when the system voltage varies.

13. The circuit of claim 11, wherein the cross voltage of the second transistor is associated with the temperature, such that the load current measurement unit outputs the measurement signal associated with the temperature when the temperature varies.

14. The circuit of claim 11, wherein the dynamic reference signal is associated with the measurement signal.

15. An overcurrent detection circuit for a DC-to-DC power converter, comprising:
- a dynamic reference unit for outputting a dynamic reference signal;
- a load current measurement unit for measuring a load current of the DC-to-DC power converter to output a measurement signal;
- a first comparator including a positive input terminal coupled to the load current measurement unit, a negative input terminal coupled to the dynamic reference unit and an output terminal coupled to an overcurrent protection device for outputting an overcurrent protection signal to activate the overcurrent protection device when the measurement signal is greater than the dynamic reference signal; and
- a dynamic reference signal adjustment unit coupled between the dynamic reference unit and the output terminal of the first comparator for adjusting the dynamic reference signal, and including:
  - a third transistor;
  - a third resistor coupled between a source of a third transistor and the ground;
  - a second comparator including:
    - a positive input terminal coupled to an output terminal of the dynamic reference unit;
    - a negative input terminal coupled between the third resistor and the source of the third transistor; and
    - an output terminal coupled to a gate of the third transistor for turning on the third transistor to generate a current flowing on the third transistor when the dynamic reference signal is greater than a cross voltage of the third resistor;
  - a second current mirror for copying the current flowing on the third transistor; and
  - a fourth resistor having an end coupled to the second current mirror and the negative input terminal of the first comparator, another end coupled to the ground for outputting the dynamic reference signal according to a cross voltage of the fourth resistor.

16. The circuit of claim 15, wherein the dynamic reference signal adjustment unit adjusts the dynamic reference signal according to a ratio of the resistance of the fourth resistor and the resistance of the third resistor.

17. The circuit of claim 15, wherein the dynamic reference signal is associated with the measurement signal.

* * * * *